(12) United States Patent  (10) Patent No.: US 8,262,828 B2
Grimes et al.  (45) Date of Patent: Sep. 11, 2012

(54) SYSTEM INCLUDING INTEGRATED RFID PROGRAMMER

(75) Inventors: Mark J. Grimes, Delray Beach, FL (US); Karen Bellum Bomber, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 228 days.

(21) Appl. No.: 11/658,934

(22) PCT Filed: Aug. 19, 2005

(86) PCT No.: PCT/US2005/029706
§ 371 (c)(1),
(2), (4) Date: Jan. 29, 2007

(87) PCT Pub. No.: WO2006/033743
PCT Pub. Date: Mar. 30, 2006

(65) Prior Publication Data
US 2009/0159191 A1  Jun. 25, 2009

Related U.S. Application Data

(60) Provisional application No. 60/604,928, filed on Aug. 27, 2004.

(51) Int. Cl.
*B32B 38/10* (2006.01)
*B32B 38/14* (2006.01)
(52) U.S. Cl. .................................... 156/249; 156/367
(58) Field of Classification Search .................. 156/247, 156/249, 367; 53/415
See application file for complete search history.

(56) References Cited

U.S. PATENT DOCUMENTS

| | | | |
|---|---|---|---|
| 5,402,310 A * | 3/1995 | Penniman ................ | 361/679.43 |
| 6,246,326 B1 * | 6/2001 | Wiklof et al. ............. | 340/572.1 |
| 2003/0189490 A1 * | 10/2003 | Hogerton et al. .......... | 340/572.8 |
| 2004/0046027 A1 * | 3/2004 | Leone et al. ............. | 235/462.13 |
| 2004/0137855 A1 * | 7/2004 | Wiley et al. .............. | 455/88 |
| 2005/0022470 A1 * | 2/2005 | Focke et al. ............. | 53/415 |

* cited by examiner

*Primary Examiner* — Philip Tucker
*Assistant Examiner* — Vicki Wu

(57) ABSTRACT

An RFID applicator system including an integrated RFID programmer for programming RFID labels prior to affixing the labels to items. The system may also include an integrated printer for printing on the RFID labels prior to affixing the labels to items. A remote device for controlling the programmer is also provided.

14 Claims, 3 Drawing Sheets

US 8,262,828 B2

SYSTEM INCLUDING INTEGRATED RFID PROGRAMMER

TECHNICAL FIELD

The invention relates to systems for programming an RFID label, and, more particularly, a system for integrating the programming of an RFID label into a variety of applications, such as with printers, high-speed label applicators, handheld applicators and dispensers.

BACKGROUND INFORMATION

Radio frequency based identification (RFID) is widely used in the identification and tracking of products, equipment, and other articles. For example, RFID systems are commonly used in electronic article surveillance (EAS) and in logistical and inventory systems for monitoring goods and equipment and recording information on the target item. A RFID system typically includes a RFID reader and a RFID device such as a tag or label. The RFID reader may transmit a radio-frequency carrier signal to the RFID device. The RFID device may respond to the carrier signal with a data signal encoded with information stored on the RFID device. RFID devices may store information such as a unique identifier or Electronic Product Code (EPC) associated with an article or item.

Typically, RFID labels are programmed with associated information, e.g. an EPC, prior to application or use. For example, a work station or hand-held unit may be used to program the label. Programming systems have also been combined with table-top printers to provide a programmed label including printed information on a surface thereof for manual application. One example of such a combined table-top programmer/printer is the R402 RFID Label Printer/Encoder, available from Zebra Technologies International, LLC of Vernon Hills, Ill. These programmer/printer stations have been used to pre-program and print labels before the labels are fed into the applicator system for application to an item. This is a costly two-step process, requiring two separate pieces of equipment.

Automated label applicators have been used to apply spools of pre-programmed RFID labels to items or articles. In one known configuration, a supply spool is provided including printed labels removably affixed to a web of liner material. The labels and liner are fed from the spool through a serious of feed rollers to an applicator. In synchronization with this operation, the item to which the label is to be affixed is fed along a conveyor to an application area beneath the applicator. The applicator may include, for example, a vacuum (air-based) system or a mechanical applicator. As the labels are fed to the applicator, the liner is removed from the label and the applicator applies the RFID label to the item traveling along the conveyor. The used liner is subsequently taken up by a rewind spool.

It is known to incorporate a separate printer into such a system, typically located proximate the applicator, for printing the label prior to application. In such systems, the label is programmed at a separate programming station after it is printed and applied to the item. Unfortunately, however, known systems have not integrated RFID programming into the application process, resulting in a time intensive and expensive approach to applying programmed labels to associated items.

Accordingly, there is a need for a system for applying RFID labels to various devices, such as by affixing the label mechanically onto equipment or integrating into the equipment, wherein the system includes an integrated RFID label programmer.

SUMMARY OF THE INVENTION

The invention relates to a system for integrating the programming of an RFID label into a variety of applications, such as with printers, high-speed label applicators, handheld applicators and dispensers. Embodiments of the invention may include a system for affixing an RFID label to an item having a programming unit for receiving one or more RFID labels from a label supply, the programming unit configured to program information on the label; and an applicator for receiving the programmed label from the programming unit and applying the label to an item.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

For simplicity and ease of explanation, the invention will be described herein in connection with various exemplary embodiments thereof. Those skilled in the art will recognize, however, that the features and advantages of the invention may be implemented in a variety of configurations. It is to be understood, therefore, that the embodiments described herein are presented by way of illustration, not of limitation.

Figure 1:
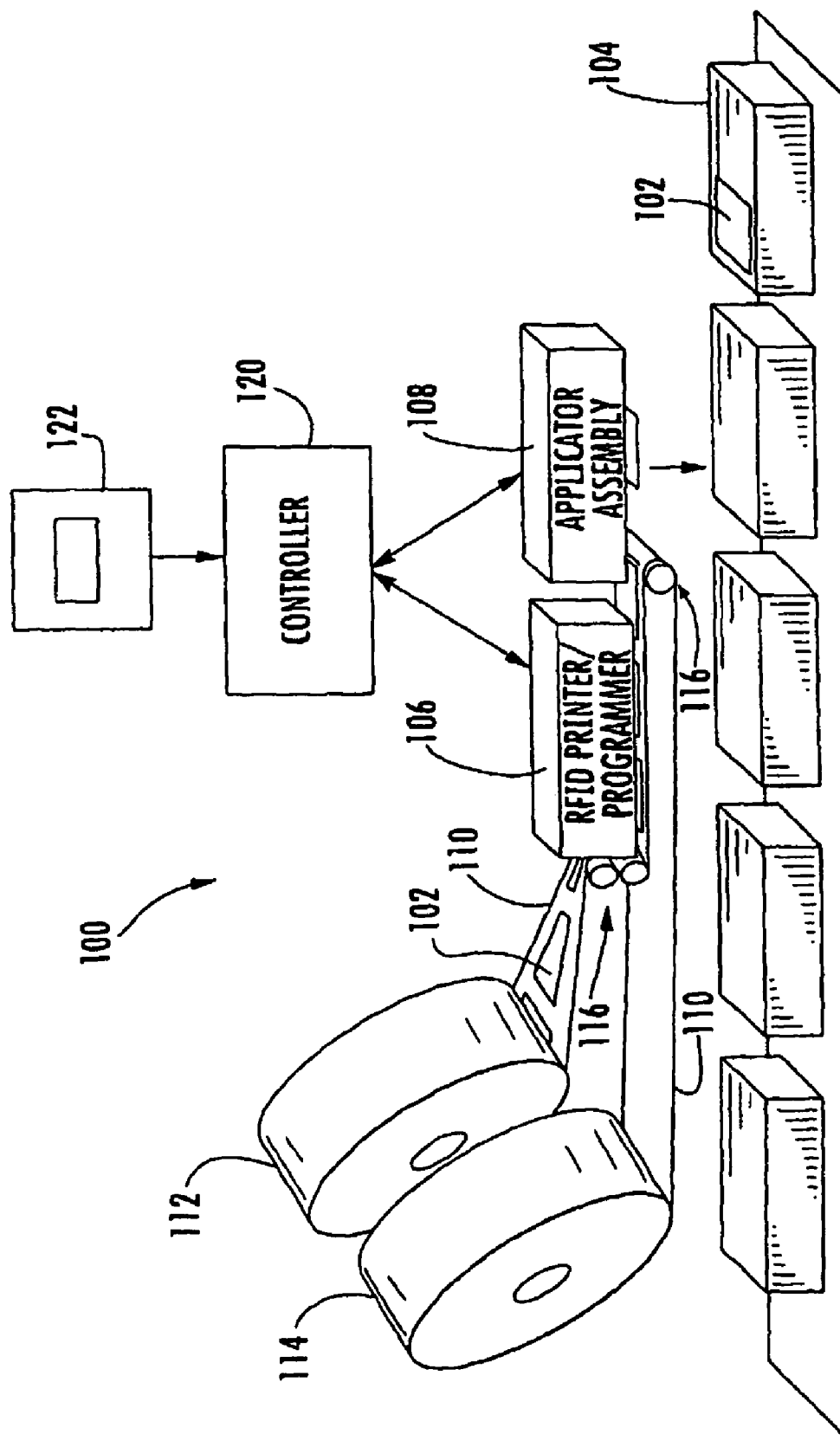
FIG. 1 is a diagrammatic view of one exemplary embodiment of an RFID applicator consistent with the invention.

FIG. 1 illustrates one exemplary embodiment of a radio frequency identification RFID) label applicator system 100 consistent with the invention including integrated label printing, programming, and application. The applicator system 100 may include an integrated programming/printing 106 unit configured to program and, optionally, print on RFID labels 102 and an applicator 108 configured apply the programmed RFID labels 102 to articles or items 104. The articles or items 104 may be products, merchandise, or any other items or articles that may be monitored using RFID techniques.

In the illustrated exemplary embodiment, blank RFID labels 102, i.e. labels that have not been completely programmed, may be removably secured to a backing material or web 110 and wound around a supply roll 112. The web 110 may be drawn or advanced from the supply roll 112 to the integrated printer/programming unit 106. The integrated printer/programming unit may be configured to program the labels with associated information and, in one embodiment, to print on the labels while the labels are supported on the web 110.

In synchronization with this operation, items 104 to which the labels 102 are to be affixed may be fed along a conveyor 118 to an application area beneath the applicator 108. After the integrated printing/programming unit 106 programs and prints the labels 102, the system 100 may pass the labels to the applicator 108, which may include any known applicator configuration for removing the label from the web (e.g. by peeling over a peeler bar) and affixing it to an associated item 104 traveling along the conveyor 118 (e.g. using an air or vacuum actuated tamp assembly). After the RFID labels 102 are removed from the web for application to an item (or rejected as being defective), scrap web 110 may be rewound onto a rewind roll 114. The rewind roll may be driven to assist in rewinding the scrap web 110 on the roll.

The RFID label applicator system 100 may include an applicator controller 120 to control operation of the system 100. The applicator controller 120 may be a programmable logic controller (PLC), such as the type available from Allen-Bradley, Omron or Mitsubishi, or a general purpose computer, such as a PC, programmed to control one or more operations of the applicator 100. The controller 120 may be coupled to the supply 112, rewind 114 and/or feed rollers 116 (e.g., to the motors, sensors, etc. thereof) to control the feeding of the web 110 through the system 100 and/or to control the positioning of the RFID labels 102 relative to the RFID printer/programming unit 106. The controller 120 may also be coupled to the applicator assembly 108 to control application of programmed, printed and removed RFID labels to the items 104. A user interface/control panel 122 may be coupled to the controller 120 to enable a user to monitor the application process and/or to provide commands and/or operating parameters to the controller 120.

The controller 120 and/or user interface 122 may also be coupled to the integrated printer/programming unit 106 to control the RFID printing and programming operations. RFID label printing operations may be controlled, for example, by controlling the printer to print associated indicia, e.g. product and/or source identifiers, on the labels upon receiving an indication that the RFID labels 102 are properly positioned relative to the integrated printer/programming unit 106. RFID programming operations may be controlled, for example, by allocating Electronic Product Codes (EPC's) and/or other data to be sent to the RFID labels 102 upon receiving an indication that the RFID labels 102 are properly positioned relative to the integrated printer/programming unit 106. The controller 120 may also monitor detection of defective labels to control a label reject assembly. The controller 120 may further collect printing and/or programming data and statistics and provide such data to the user.

Figure 2:
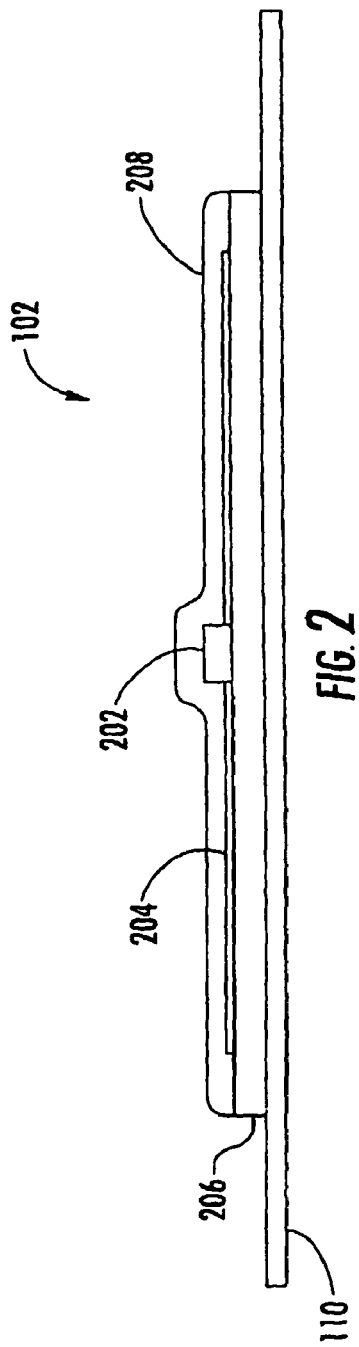
FIG. 2 is a side cross-sectional view of one exemplary embodiment of a RFID label that can be used in an RFID applicator consistent with the invention.

One embodiment of a RFID label 102 is shown in greater detail in FIG. 2. The RFID label 102 may include an integrated circuit (IC) chip 202 coupled to an antenna 204. The IC chip 202 and antenna 204 may be sandwiched between one or more layers or substrates, such as an adhesive substrate 206 and a printable layer 208. The adhesive substrate 206 may include a scrim coated on each side with an adhesive, such as an acrylic based adhesive. The printable layer 208 may be made of a thermal transfer paper or other material suitable for printing. One or more additional layers or substrates may also be incorporated into the RFID label 102, as is known to those skilled in the art. The web 110 may be made of a paper with a release agent such as wax or silicone to allow the RFID label 102 to peel away from the web 110. The RFID label 102 may have a peel adhesion strength (e.g., about 15 N/inch) that allows the RFD label 102 to be removably adhered to the web 110 and later adhered to the items 104. Although RFID labels may have various sizes, one example of the RFID label 102 may be about 3 in. by 3 in. and supported on a web 110 having a width of about 4 in.

One example of a RFID label 102 is the "Combo EAS/RFID Label or Tag" disclosed in U.S. Provisional Patent Application Ser. No. 60/628,303, which is fully incorporated herein by reference. Other examples include the RFID labels commercially available under the name Sensormatic® from Tyco Fire and Security. Those skilled in the art will recognize that the RFID label 102 may include any RFID device capable of being adhered or otherwise secured to articles or items.

Figure 3:
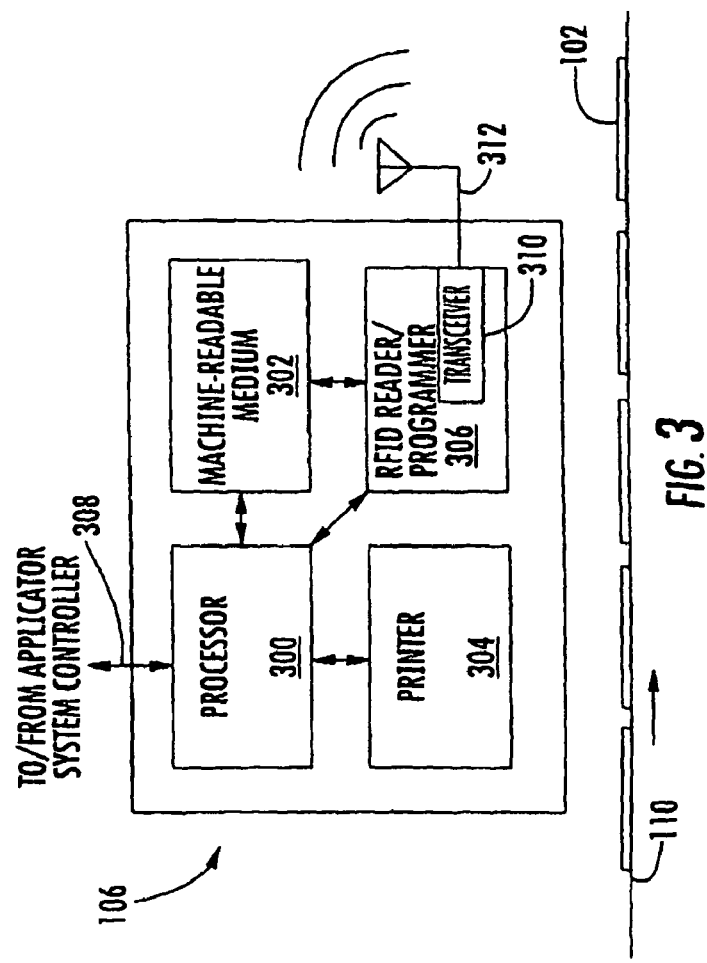
FIG. 3 is a block diagram of an exemplary integrated printer/programming unit consistent with the invention.

Turning now to FIG. 3, there is shown in block diagram form one exemplary embodiment of an RFID printing/programming unit 106 useful in a system consistent with the invention. As shown, one embodiment of the integrated printing programming unit 106 may include a processor 300, a machine-readable medium 302 for storing one or more programs to operate the processor, a printer 304 controlled by the processor, and a RFID reader/programmer 306 controlled by the processor. Again, the printing/programming unit 106 may be integrated into the applicator system 100 for programming and, optionally, printing labels 102 with associated information as, for example, they pass by the printing/programming unit 106 on a web 110 drawn from a supply roll 112. The printing and programming operations may be performed in any order. Also, in an embodiment wherein printing on the labels is not necessary or desired, the printer 304 may omitted from the unit 106, or disabled. In one embodiment, the processor 300 may control printing and programming functions under the control of the system controller 120 through a control input 308 received from the system controller 120. Those of ordinary skill in the art will recognize, however, that although the processor 300 and the machine-readable medium 302 are shown as being integrated into the printing/programming unit 106, the processor and/or the machine-readable medium 302 may be incorporated into the system controller 120 or another separate local or remote component.

The printer 302 may include any known printer configuration, e.g. an inkjet or laser-type printing head and ink supply, and may be configured for printing on the RFID labels under the control of the processor 300. The RFID reader/programmer 306 may include any RFID reader/programmer known to those of ordinary skill in the art for reading and/or programming RFID devices, such as the type known as the Sensormatic® SensorID™ Agile 2 Reader available from Tyco Fire and Security. The RFID programming system 106 may also be capable of detecting defective RFID labels, for example, by attempting to read a RFID label after applying programming signals. In one embodiment, the RFID reader/programmer 106 may generally include a transceiver 310 (transmitter and receiver) for transmitting information to and reading information received from the label 102 under instruction from the processor, and an antenna 312 connected to the transceiver 310 for propagating a signal to and from the label 102.

Figure 4:
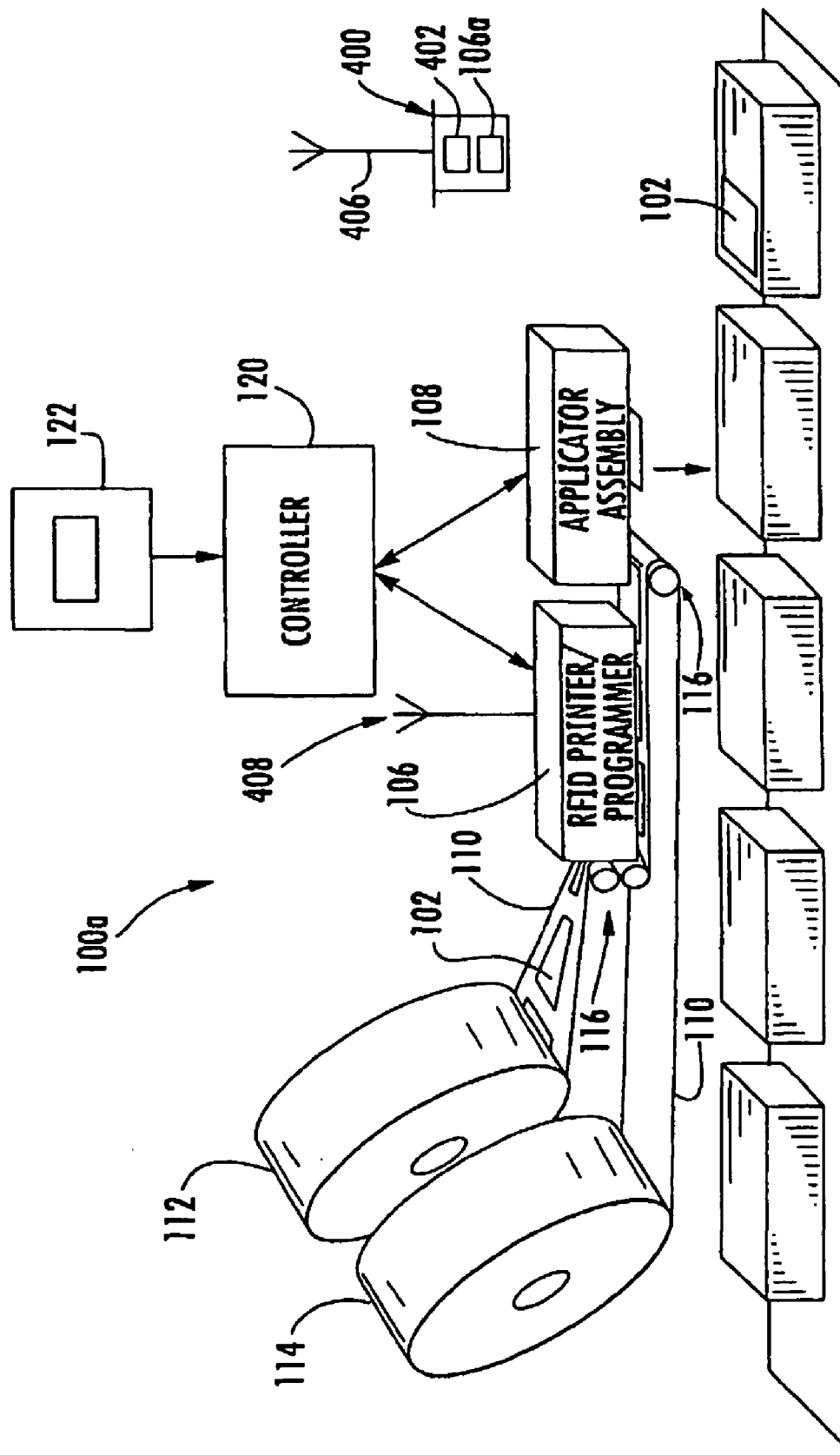
FIG. 4 is a diagrammatic view of another exemplary RFD applicator consistent with the invention.

Another exemplary embodiment 100a of a system consistent with the invention is illustrated in FIG. 4. As shown in FIG. 4, an applicator system consistent with the invention may include a remote, e.g. handheld, unit 400 in wireless communication with the printing/programming unit 106 and/or system controller 120. Those of ordinary skill in the art will recognize that the remote unit 400 may be configured for wireless communication with one or more of the applicator system 100a components in a variety of ways, e.g. through communication of electromagnetic signals between antennas 406, 408, by an infra red link such as an IrDA0 link, etc.

The remote unit may include a user interface/control panel 402, a processor, and a machine-readable medium including instructions adapted to be executed by the processor to allow a user to monitor the automated printing/programming and application process and to reconfigure programming of the labels 102 remotely, i.e. without the need to access the printing/programming unit 106 or the system controller 120 directly. In addition, or alternatively, the remote unit may include an integrated printer/programming unit 106a for allowing remote printing, reading and/or programming of RFD labels. The printer/programming unit 106a may be configured as shown in FIG. 3, with the printer optionally omitted to reduce the size of the device, and may be provided on a single circuit board for driving a reading/programming antenna, e.g. antenna 312. The remote unit may also include a power source, e.g. a battery and/or may be configured to dock with a base station, as disclosed, for example in U.S. patent application Ser. No. 10/412,739, the teachings of which are incorporated herein by reference.

It will be appreciated that the functionality described for the embodiments of the invention may be implemented in the integrated printer/programmer 106, 106a, the system controller 120, or other system component using hardware, software, or a combination of hardware and software, and well-known signal processing techniques. If implemented in software, a processor and machine-readable medium is required. The processor can be any type of micro-processor or logic circuitry capable of providing the speed and functionality required by the embodiments of the invention. For example, the processor could be a processor circuit from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other unit that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, the processor and machine-readable medium may be part of a larger system that may contain various combinations of machine-readable storage units through various I/O controllers, which are accessible by the processor and which are capable of storing a combination of computer program instructions and data.

According to one aspect of the invention, there is provided a system for affixing an RFID label to an item including: a programming unit for receiving one or more RFID labels from a label supply, the programming unit being configured to program information on the label; and an applicator for receiving the programmed label from the programming unit and applying the label to an item.

According to another aspect of the invention, there is provided a system for affixing an RFID label to an item including: a label supply including a plurality of RFID labels removably affixed to a web of material; a programming unit configured to receive one or more of the labels from the label supply and program information on the label while the label is affixed to the web; a printer configured to receive the one or more of the labels from the label supply and to print on the label while the label is affixed to the web; and an applicator configured to remove the label from the web and apply the label to an item.

According to another aspect of the invention, there is provided a method of affixing an RFID label to an item including: receiving one or more RFID labels from a label supply including a plurality of the RFID labels removably affixed to a web of material; programming information on the label while the label is affixed to the web; removing the label from the web; and applying the label to an item.

While the principles of the invention have been described herein, it is to be understood by those skilled in the art that this description is made only by way of example and not as a limitation as to the scope of the invention. Other embodiments are contemplated within the scope of the invention in addition to the exemplary embodiments shown and described herein. Modifications and substitutions by one of ordinary skill in the art are considered to be within the scope of the invention, which is not to be limited except by the following claims.

What is claimed is:

1. A system for programming RFID labels and affixing an RFID label to an item comprising:
   an integrated label programmer/applicator unit, comprising:
   a programming unit for receiving one or more RFD labels from a label supply, said programming unit configured to program information on said labels on the label supply, said programming unit comprising: a processor, a machine-readable medium coupled to said processor and storing instructions adapted to be executed by said processor, a transmitter coupled to said processor, a receiver coupled to said processor, and an antenna coupled to said transmitter and said receiver for transmitting and receiving signals to and from said label
   an applicator for receiving said programmed label from said programming unit and applying said label to an item;
   a controller coupled to said programming unit and said applicator, and
   a user interface allowing a user to monitor the operation of said integrated label programmer/applicator unit and provide commands and operating parameters to said controller; and
   a self-contained remote unit having a user interface in wireless communication with said controller, said remote unit operable in a first mode of operation to monitor said integrated label programmer/applicator unit and provide commands and operating parameters to said controller from a location remote from said integrated label programmer/applicator unit, said remote unit further including an integrated RFID label reader/programmer unit allowing the remote unit in a second mode of operation to read and program RFID labels at a location remote from said integrated label programmer/applicator unit.

2. A system according to claim 1, wherein said label supply comprises a plurality of labels removably affixed to a web of material wound on a supply roll, and wherein said system is configured to advance said labels from said label supply past said programming unit and then to said applicator said programming unit is configured to receive one or more of said labels from said label supply and program information on said label while said label is affixed to said web, and said applicator is configured to remove said label from said web and apply said label to an item.

3. A system according to claim 2, further comprising a printer configured to receive said one or more of said labels from said label supply and to print on said label while said label is affixed to said web.

4. A method of programming RFID labels and affixing an RFID label to an item comprising:
- receiving one or more RFID labels from a label supply comprising a plurality of said RFID labels removably affixed to a web of material;
- programming information on said label while said label is affixed to said web, wherein said programming is performed by an integrated programmer/applicator unit comprising a processor, a machine-readable medium coupled to said processor and storing instructions adapted to be executed by said processor, a transmitter coupled to said processor, a receiver coupled to said processor, an antenna coupled to said transmitter and said receiver for transmitting and receiving signals to and from said label, and an applicator for receiving the programmed label and applying the label to an item;
- establishing a wireless communication link between a self-contained remote device and the integrated programmer/applicator unit, the remote device including a user interface wherein the remote device has a first mode of operation allowing user to monitor the integrated label programmer/applicator unit and provide commands and operating parameters to a controller coupled to the integrated label programmer/applicator unit from a remote location, the remote unit further including an integrated RFID label reader/programmer unit wherein the remote unit can be used to read and/or program RFID labels at a location remote from the integrated label programmer applicator unit in a second mode of operation;
- removing said label from said web; and
- applying said label to an item.

5. A method according to claim 4, wherein the integrated programmer applicator unit further comprises a printer, and said method further comprising printing on said label while said label is affixed to said web.

6. A system according to claim 1, wherein said remote unit is a handheld unit.

7. A system according to claim 6, wherein said remote unit is a handheld unit includes a power source.

8. A system according to claim 7, wherein said power source is a battery.

9. A system according to claim 7, wherein said remote unit is configured to dock with a charging base.

10. A system according to claim 4, wherein said remote unit is a handheld unit.

11. A system according to claim 10, wherein said remote unit is a handheld unit includes a power source.

12. A system according to claim 11, wherein said power source is a battery.

13. A system according to claim 12, wherein said remote unit is configured to dock with a charging base.

14. The system according to claim 3, wherein said printer is integrated with said programming unit.

* * * * *